Dec. 25, 1951     O. J. POUPITCH     2,580,319
ROTARY FASTENER
Filed Dec. 12, 1947
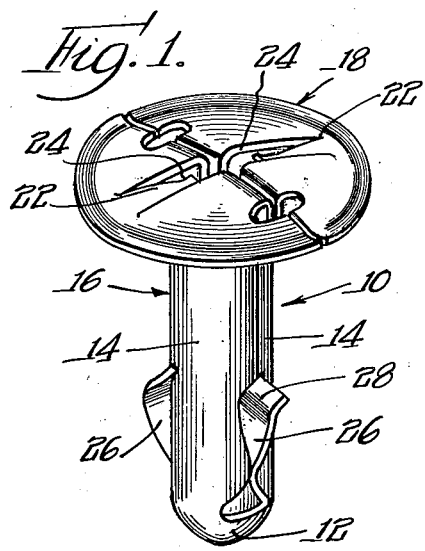
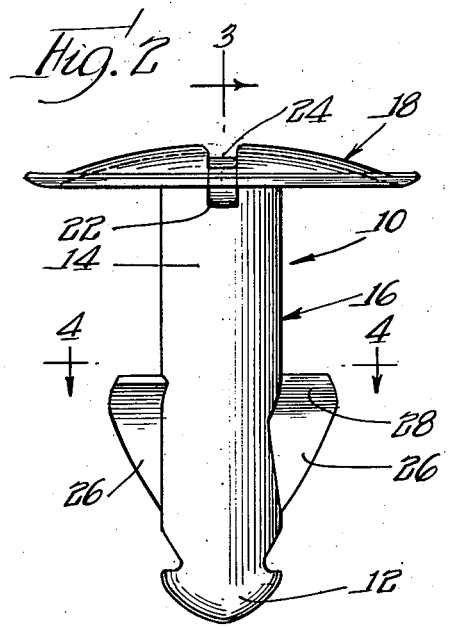
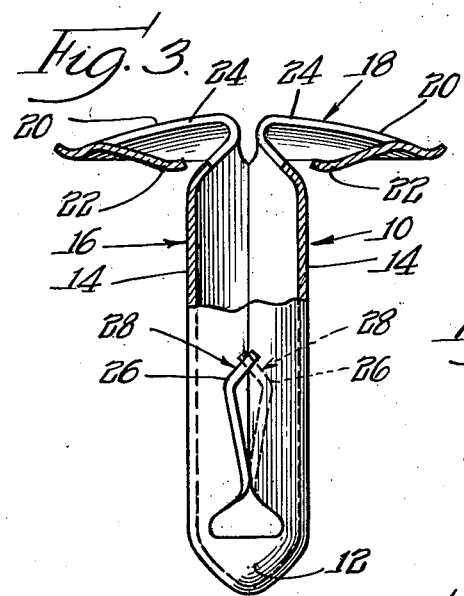
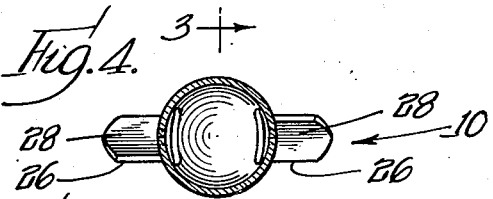
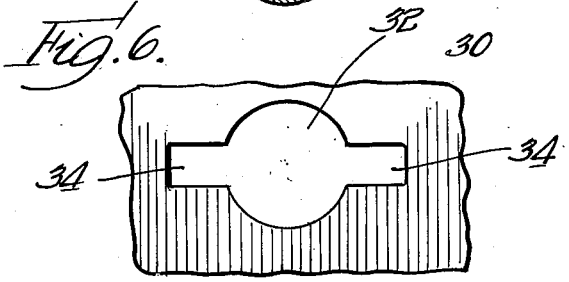
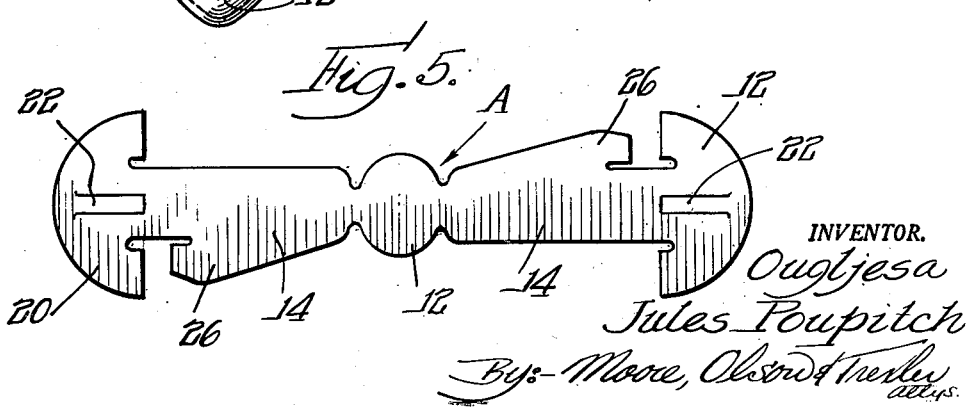
INVENTOR.
Ougljesa Jules Poupitch
By: Moore, Olson & Trexler
attys.

Patented Dec. 25, 1951

2,580,319

UNITED STATES PATENT OFFICE 2,580,319

ROTARY FASTENER

Ougljesa Jules Poupitch, Chicago, Ill., assignor to Illinois Tool Works, Chicago, Ill., a corporation of Illinois Application December 12, 1947, Serial No. 791,381

5 Claims. (Cl. 24—221)

1

This invention relates generally to rotary fasteners and, more particularly, to rotary fasteners adapted to be made from a single piece of sheet metal stock and designed for relatively quick attachment and detachment in response to partial rotation thereof.

Quickly operable rotary fasteners, such as fasteners heretofore known as cowl fasteners, have been used extensively for securing cowling parts as, for example, cowling parts of aircraft. It has been common practice in the production of the aforesaid cowl fasteners to employ a solid cylindrical stud member equipped with a head at one end and a cross pin spaced axially from the head. Such studs are relatively expensive to produce because of the solid round stock from which they are made and, further, because of the necessity of associating a cross pin with the stud shank. It is an important object of the present invention to provide a quickly operable fastener of the type referred to above, which may very inexpensively be produced from a single piece of sheet metal stock, which will avoid the necessity of combining two elements, such as a stud and cross pin or a stud and head structure.

More specifically, the invention contemplates a quickly operable fastener made from a single elongated sheet metal blank folded and formed intermediate its extremities so as to produce a sheet metal tubular shank comprising oppositely concaved elongated sections and integral head section at one extremity thereof and lugs formed integral with and extending laterally from each of said elongated shank sections.

It is a further object of the present invention to provide a fastener of the type referred to above in which the lugs formed integral with the shank portions which are designed for camming co-action with one side of a work piece so as to firmly hold said work piece or pieces between the lug and stud head.

Another object of the present invention is to provide, in a one piece sheet metal rotary fastener, a resilient head structure which will cooperate with the lugs in establishing axial tension when the fastener is secured in work clamping position.

It is still a further object of this invention to provide a simple, inexpensive, yet exceptionally strong sheet metal fastener as referred to above, in which means are provided to cause an interlock between the fastener and the work piece when the fastener is rotated to its work fastening position, thereby securing the fastener against inadvertent or unauthorized loosening.

The foregoing and other objects and advantages will be more apparent from the following detailed description when considered in connection with the accompanying drawings wherein Figure 1 is a perspective view of a one piece sheet metal rotary fastener, which represents one embodiment of the present invention.

Figure 2 is a side elevational view of the fastener disclosed in Figure 1.

Figure 3 is a longitudinal sectional view taken substantially along the line 2—2 of Figure 3, the lower portion of the fastener shank being shown in elevation in order to more clearly understand the structural arrangement of the lugs or cam elements.

Figure 4 is a transverse sectional view taken substantially along the line 4—4 of Figure 2.

Figure 5 is a plan view of a blank from which the fastener shown in Figs. 1-4, inclusive, may be produced; and Figure 6 is a plan view of a work sheet provided with an aperture of the type designed to accommodate the fastener of the present invention.

Referring now to the drawings more in detail wherein like numerals have been employed to designate similar parts throughout the various figures, it will be seen that one embodiment of the invention is illustrated by the rotary fastener designated generally by the numeral 10, Fig. 1-4, inclusive. It will be seen that the fastener 10 may be formed from a single piece of sheet metal stock, as illustrated by the blank in Figure 5, said blank being designated generally by the numeral A. This blank A may be bent intermediate its extremities so as to provide a blunt entering end 12. This entering end 12 provides an integral connection between identical longitudinal oppositely concaved shank sections 14. The longitudinal margins of these shank sections 14 abut each other and the two sections cooperate in presenting a tubular stud portion, designated generally by the numeral 16.

The end of the shank 16 oppositely disposed from the entering end 12 is provided with a resilient head structure, designated generally by the numeral 18. This head structure is comprised of laterally extended resilient dished head sections 20 formed integral with the shank portions 14. Struck downwardly from the central portion of each resilient head section 20 are locking or latching fingers 22, the purpose of which will be later described. Striking out the locking or latching fingers 22 presents a recess or cross slot 24 extending across the resilient head 18. This recess is of a size to accommodate the blade of a conventional turning tool, such as a screw driver (not shown).

Attention is now directed to wing-like lugs 26, which are formed integral with and extend laterally or radially outward from one margin of each shank section 14. It will be noted that the upper portions of these lugs 26 provide cam surfaces 28. These cam surfaces 28 are preferably rigid and are designed primarily to coact with complementary rigid surfaces of a work piece as, for example, the apertured work piece 30 illustrated in Figure 6. The work piece 30 is provided with an aperture 32, slightly larger in diameter than the stud 16 and radial recesses 34, communicating at their inner ends with the circular recess 32. These radial openings 34 are designed to accommodate the lateral lugs or wings 26. Particular attention is directed to the fact that the upper or free extremities of the lugs 26 overlap the abutting margins of the concaved shank sections 14, Figure 3. By this construction, lateral shifting of the shank sections with respect to each other is positively avoided.

In applying the fastener to a work piece as, for example, the apertured work piece 30, the shank 16 passes through the aperture 30 and the lugs 26 register with and pass through the radial openings 34. Obviously, the thickness of the work piece or pieces must be greater than the minimum distance between the lug 26 and the under side of the fastener head 18. After the fastener has been initially inserted to its limiting position, it may be rotated by the use of a screw driver blade within the aligned head recesses 24. This causes the inclined surfaces 28 of the lugs 26 to exert a camming action against the complementary adjacent portions of the under side of the work. Continued rotation causes the head 18 to be flattened against the work surface, thereby setting up strong resilient axial tension. When the fastener has been rotated through 90°, the latching fingers 20 are brought into registration and spring into locking association with the radial recesses 34 in the work piece. This secures the fastener against unauthorized or inadvertent rotation after it has once been secured in place.

From the foregoing, it will be apparent that the present invention contemplates an improved, quickly operable sheet metal fastener of the rotary type. The entire fastener is formed from a single piece of sheet metal stock and, although of sheet metal construction, it is capable of withstanding relatively high shear and tensile stresses. The device may be manufactured by practicing conventional stamping and forming operations and hence may be produced with the greatest economy. The resilient coaction between the fastener head and the lugs or wings formed integral with the stud shank assures a very firm fastening and also makes possible automatic interlocking between the latching fingers on the head and complementary recesses in the work. It will be apparent that the resilient latching fingers disclosed herein are representative of only one embodiment of this feature of the invention. Other forms of protuberances or projections extending downwardly from the head may be employed to interlock with complementary apertures in the work.

While, for purposes of illustration, certain structural features have been disclosed herein, it will be understood that the invention is capable of other modifications and changes without departing from the spirit and scope of the claims appended hereto.

I claim:

1. A quickly operable sheet metal rotary fastener comprised of a single piece of sheet metal stock, including oppositely concaved shank sections having their longitudinal margins in abutting relation, a head portion on one extremity of and formed integral with said shank sections, said head portion having means adapted to be gripped for rotating the shank sections, and oppositely disposed lugs formed integral with and extending outwardly from the periphery of said shank sections, each of said lugs presenting relatively rigid wing-like structures which sufficiently overlap the adjacent abutting margins of the shank sections to prevent lateral shifting of said shank sections.

2. A quickly operable sheet metal rotary fastener comprising concaved shank portions having their longitudinal edges arranged to form a tubular shank, a head portion on one extremity of and formed integral with said shank, and oppositely disposed lugs formed integral with and extending outwardly from said shank sections, each of said lugs presenting relatively rigid wing-like structures having extensions which overlap the adjacent margins of the shank sections to prevent lateral shifting of the shank sections.

3. A quickly operable sheet metal rotary fastener for mounting in a work piece comprising two oppositely concave shank portions joined at one end, the longitudinal edges of said shank portion being adapted to lie in abutting relationship to provide a tubular shank, a head adjacent one end of said shank to engage one surface of the work piece, and lug means formed on at least one of the longitudinal edges of said shank portion and extending radially outwardly therefrom for engaging the opposite side of said work piece, said head and said lug means being relatively yieldable axially of the shank and cooperating to clampingly engage the work piece therebetween upon rotation of the fastener relative to the work piece, said lug means being shaped to overlie the junction of said longitudinal edges whereby to maintain said edges in abutting relationship.

4. A quickly operable sheet metal rotary fastener for mounting in a work piece comprising two oppositely concave shank portions joined at one end, the longitudinal edges of said shank portion being adapted to lie in abutting relationship to provide a tubular shank, a head adjacent one end of said shank to engage one surface of the work piece, lug means formed on at least one of the longitudinal edges of said shank portion and extending radially outwardly therefrom for engaging the opposite side of said work piece, said head and said lug means being relatively yieldable axially of the shank and cooperating to clampingly engage the work piece therebetween upon rotation of the fastener relative to the work piece, and latching means struck out from said head toward said lug means adapted to engage complementary recess portions in a work piece whereby to prevent inadvertent retrograde rotation of said fastener when in mounted position.

5. A fastener as set forth in claim 4, wherein the area defined by the struck-out latching means provides a recess for accommodating a turning tool such as a screw driver blade.

OUGLJESA JULES POUPITCH.

(References on following page)

REFERENCES CITED

The following references are of record in the file of this patent:

UNITED STATES PATENTS

| Number | Name | Date |
|---|---|---|
| 1,772,255 | Kondolf | Aug. 5, 1930 |
| 2,238,854 | Wagstaff | Apr. 15, 1941 |
| 2,318,840 | Del Camp | May 11, 1943 |
| 2,340,250 | Murphy | Jan. 25, 1944 |
| 2,373,722 | Von Opel | Apr. 17, 1945 |
| 2,399,181 | Graham | Apr. 30, 1946 |
| 2,408,340 | Poupitch | Sept. 24, 1946 |
| 2,422,289 | Churchill | June 17, 1947 |
| 2,509,192 | Poupitch | May 23, 1950 |

FOREIGN PATENTS

| Number | Country | Date |
|---|---|---|
| 480,240 | Great Britain | 1938 |